May 15, 1945.  W. McK. MARTIN  2,375,806
FLOAT VALVE
Filed Dec. 2, 1941  2 Sheets-Sheet 1
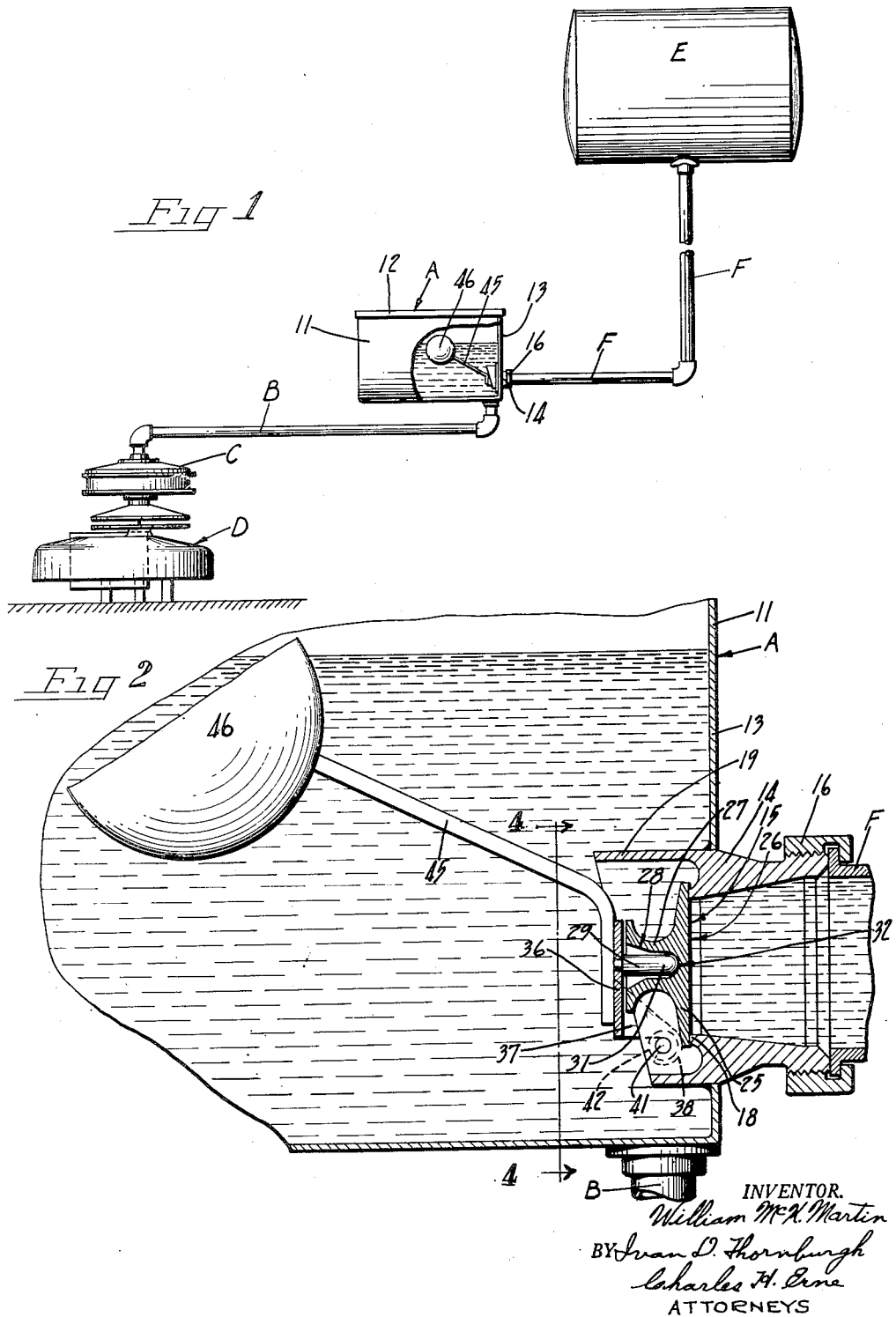
INVENTOR.
William McK. Martin
BY Ivan D. Thornburgh
Charles H. Erne
ATTORNEYS May 15, 1945.     W. McK. MARTIN     2,375,806
FLOAT VALVE
Filed Dec. 2, 1941     2 Sheets-Sheet 2
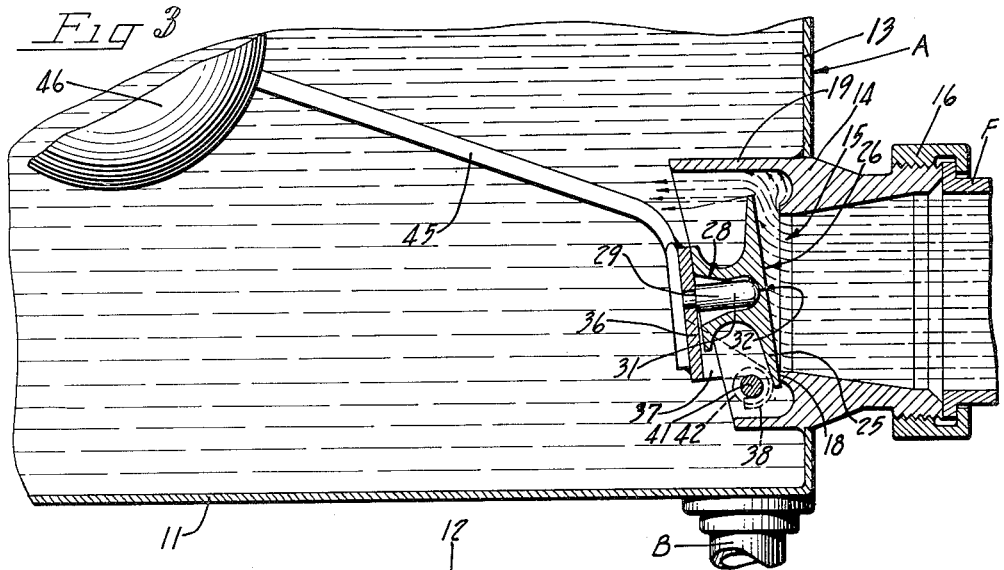
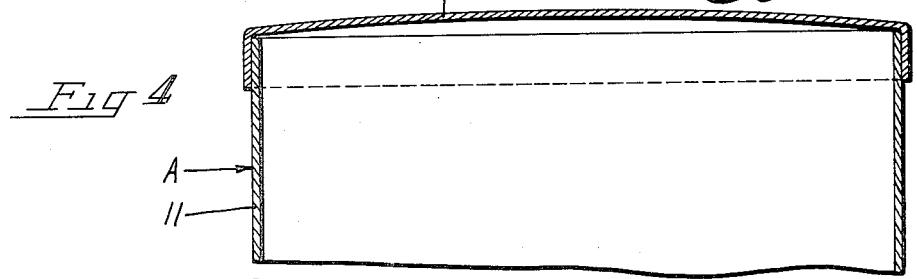
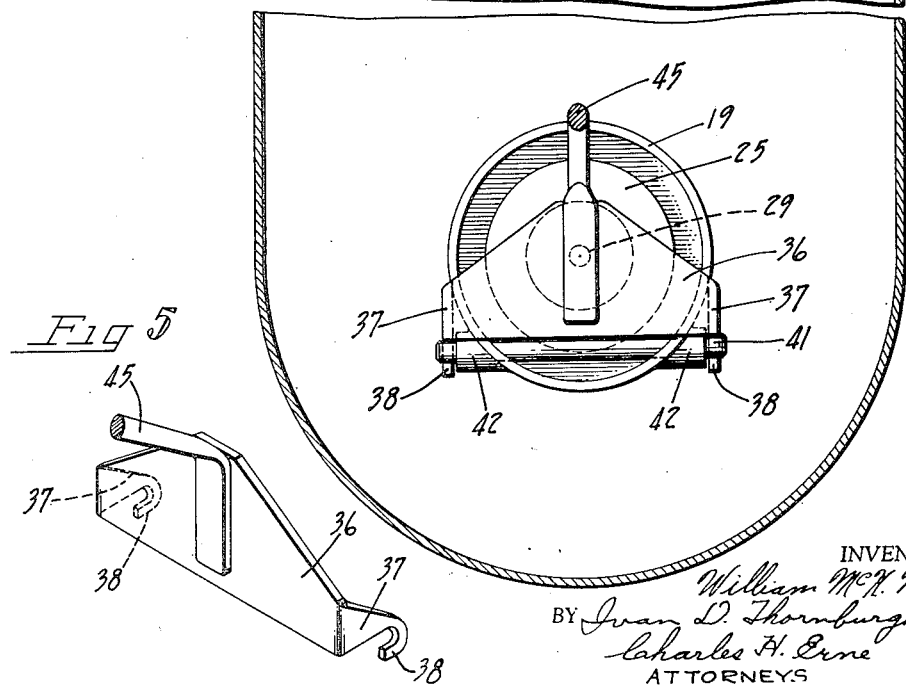
INVENTOR.
William McK. Martin
BY Ivan D. Thornburgh
Charles H. Erne
ATTORNEYS Patented May 15, 1945

2,375,806

UNITED STATES PATENT OFFICE 2,375,806

FLOAT VALVE

William McK. Martin, Maywood, Ill., assignor to American Can Company, New York, N. Y., a corporation of New Jersey Application December 2, 1941, Serial No. 421,354

2 Claims. (Cl. 137—104.12)

The present invention relates to a liquid level regulating device and has particular reference to a float valve feature which may be readily taken apart for cleaning.

In the handling of milk and the like products in filling machines, such as used in dairies, it is often desirable to regulate the hydrostatic pressure therein by maintaining a desired liquid level in a tank in the supply pipe lines leading to the filling machine. For sanitary reasons all devices used for such purposes must be readily taken apart for frequent cleaning. This usually requires considerable time and sometimes results in damage to parts of the devices.

The instant invention contemplates providing a float valve regulator of simple construction which may be quickly taken apart for cleaning and which may be economically maintained in proper condition.

An object therefore of the invention is the provision of a float valve regulator which is positive in action and of simple construction, in which the parts may be inexpensively maintained in operating condition and may be quickly taken apart for cleaning and just as quickly reassembled.

Numerous other objects and advantages of the invention will be apparent as it is better understood from the following description, which, taken in connection with the accompanying drawings, discloses a preferred embodiment thereof.

Referring to the drawings:

Figure 1 is a schematic view of a filling machine assembly embodying the instant invention, with parts broken away and shown in section;

Figs. 2 and 3 are enlarged vertical sectional views of a float valve regulator unit used with the machine, with parts broken away, the views showing the moving parts of the unit in different positions;

Fig. 4 is a vertical section taken substantially along the line 4—4 in Fig. 2, with parts broken away; and Fig. 5 is a perspective detail of one of the parts used in the float valve unit, with a part broken away.

As a preferred embodiment of the invention the drawings illustrate a float valve regulator unit A (Fig. 1) for controlling the level of liquid in a tank so as to maintain a constant hydrostatic pressure in a supply line B which supplies homogenized milk or other liquid to a reservoir C of a container filling machine D. The filling machine preferably is of the character disclosed in United States Patent 2,222,617, issued November 26, 1940, to John M. Hothersall. The milk for the filling machine D is supplied from any suitable source of supply such as a storage tank E which is disposed at a level above the filling machine and which is connected by way of a pipe F to the regulator unit A.

The regulator unit A includes a float tank 11 having a cover 12. The bottom of the tank is connected to the supply line B while an end wall 13 of the tank carries a horizontal valve body or housing 14 (Fig. 2) which extends outside of the tank and is formed with an orifice 15. This valve body carries a pipe union 16 for securing the outlet end of the storage tank pipe F to the valve body.

Within the float tank 11 the valve body 14 is formed with a flat, ground annular valve seat 18 which surrounds the orifice 15. This seat being in a single plane facilitates regrinding or refinishing in a simple manner. The valve seat is surrounded in spaced relation by a baffle cylinder 19. The orifice of the valve body is normally closed by a disc valve 25 having a flat, ground valve seating surface 26 which hermetically seats against the valve seat 18. The valve surface 26 being in a single plane is refinished when necessary without the use of special or complicated tools and jigs.

The rear of the valve disc is formed with a boss 27 having a frusto-conical socket or recess 28 for the reception of a supporting pin 29 having a rounded end 31 which bears against a rounded surface 32 forming a spherical seat at the base of the socket. The pin and the socket in the boss thus provide a universal joint for the valve disc and also provide a loose self-aligning connection by means of which the disc may be quickly detached for cleaning without the use of tools. By reason of this self-aligning feature an efficient valve action is obtained at all times, irrespective of the particular refinishing of the valve and seat, as above contemplated.

The valve disc support pin 29 is secured in a triangular shaped hinge bracket 36 (see also Figs. 4 and 5) having a pair of spaced and parallel side arms 37 formed with depending open hinge hooks 38. These hinge hooks engage over the outer ends of a pintle 41 carried in a pair of spaced bosses 42 formed on the baffle cylinder 19. The bosses engage the inside surface of the side arms 37 of the hinge bracket 36 and thus prevent lateral movement of the bracket.

The intermediate portion of the hinge bracket 36 is secured to an actuating rod 45 which extends outwardly and upwardly into the tank at an angle to the bracket and carries a ball float 46 on its outer end. It is this ball float that rides on the surface of the milk received in the float tank 11 from the storage tank E.

The float 46 maintains the milk in the float tank 11 at a predetermined level as the milk is drawn off by the supply pipe line B for use in the filling machine reservoir C. When the milk in the float tank is at its normal level the valve disc 25 is closed against its valve seat 18 as best shown in Fig. 2 and thus prevents milk from the storage tank E from entering the regulator tank 11.

However, when the milk level in the regulator tank 11 begins to fall, even though slightly, the ball float 46 moves downwardly with the milk level and thus rocks the hinge bracket 36 inwardly, its hooks 38 hinging on the pintle 41. This moves the valve disc 25 away from its valve seat 18, as best shown in Fig. 3, and this permits milk from the storage tank E to flow into the regulator tank 11 by way of the valve body orifice 15 and thus replenish the milk supply in the regulator tank.

During this inflow of the milk the baffle cylinder 19 directs the incoming milk into a horizontal stream and thus prevents squirting of the milk. It has a further important use, that of protecting the valve seat 18 against damage in careless cleaning or handling of the parts. When the incoming milk has restored the milk level to its predetermined normal position, the float rising with the milk, rocks the valve disc into its closed position as shown in Fig. 2 to cut off the inflow from the storage tank.

In this manner the regulator device A controls the flow of milk and maintains a constant level of milk regardless of fluctuations in the outflow. This controls the hydrostatic pressure in the supply lines leading to the filling machine reservoir by maintaining a constant predetermined head pressure in the supply lines.

In dairies where such devices are used, the entire line is taken apart and cleaned after every run of milk. This usually takes place at the end of the day. With such a regulator device the entire float assembly may be readily detached without the use of tools by merely unhooking the hinge bracket 36 from the pintle 41. The valve disc 25 comes off with the hinge bracket and this disc may be removed by merely lifting it off its support pin 29. Thus all of the parts of the device may be quickly and easily removed for thorough cleaning and just as quickly and readily replaced for operation without the use of tools. This saves considerable time and expense with the added advantage of sanitary conditions, the parts being self-aligning and easily reconditioned.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A float actuated quick detachable self-aligning valve structure for controlling fluid flow in a liquid supply line, comprising a valve housing having an orifice surrounded by a flat annular valve seat, a hinge support on said housing, a float actuated bracket having a pair of spaced arms terminating in open hooks pivotally and removably engaging said support, a float secured to one side of said bracket, a pin secured at one end to the opposite side of said bracket, and a disc valve having a central outwardly projecting tubular boss provided with a central recess for loosely engaging the outer projecting end of said pin to align said valve against said seat when the valve is closed by the float and also to permit the valve to be readily lifted from said pin when said spaced arms are removed from said support, said disc valve having a flat ground valve seating surface for close fitting engagement with said flat annular valve seat, whereby said bracket may be quickly lifted from said hinge support and said valve lifted from said bracket pin, without requiring the use of tools.

2. A float actuated quick detachable self-aligning valve structure for controlling fluid flow in a liquid supply line, comprising a valve housing having an orifice surrounded by a flat annular valve seat, a hinge pintle carried by said housing, a float actuated bracket having a pair of laterally spaced arms terminating in open hooks pivotally and removably engaging opposite ends of said pintle, a float secured to one side of said bracket, means disposed adjacent said hinge pintle and engageable with the inner surfaces of said arms to prevent lateral movement of said bracket relative to said orifice, a pin having its inner end secured to the opposite side of said bracket and a rounded outer end projecting from said bracket, and a disc valve having an outwardly projecting tubular boss provided with a central rounded bottom recess for loosely engaging the outer projecting end of said pin in a universal mounting to align said valve against said seat when the valve is closed by the float and also to permit the valve to be readily lifted from said pin when said arms are removed from said pintle, said disc valve having a flat ground valve seating surface for close fitting engagement with said flat annular valve seat, whereby said bracket may be quickly lifted from said hinge pintle and said valve lifted from said bracket pin, without necessitating the use of tools.

WILLIAM McK. MARTIN.